G. VOSSBERG.
SWIVEL JOINT FOR ELECTRIC LIGHT FIXTURES.
APPLICATION FILED SEPT. 28, 1908.
958,448.
Patented May 17, 1910.
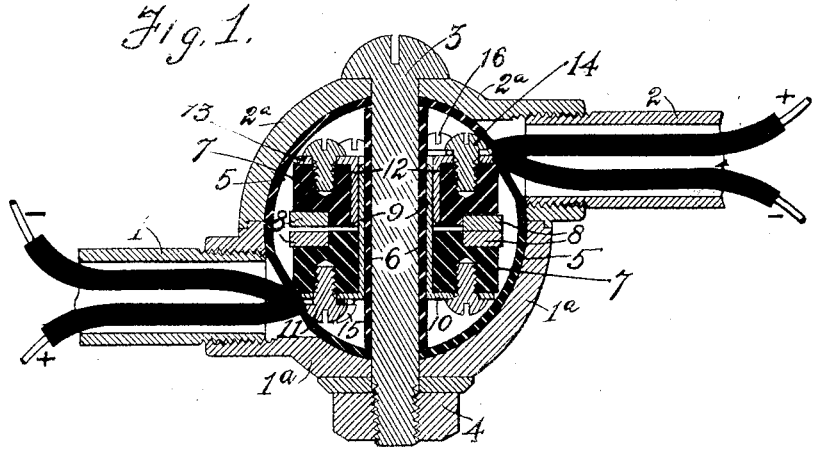
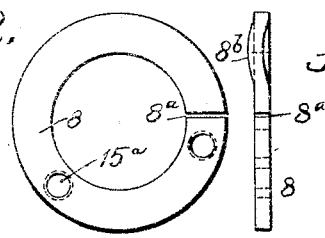 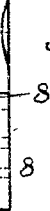
WITNESSES.
INVENTOR.

UNITED STATES PATENT OFFICE.

GUSTAV VOSSBERG, OF TOLEDO, OHIO.

SWIVEL-JOINT FOR ELECTRIC-LIGHT FIXTURES.

958,448.

Specification of Letters Patent. Patented May 17, 1910.

Application filed September 28, 1908. Serial No. 454,982.

*To all whom it may concern:*

Be it known that I, GUSTAV VOSSBERG, a citizen of the United States, residing at Toledo, in the county of Lucas and State of Ohio, have invented certain new and useful Improvements in Swivel-Joints for Electric-Light Fixtures; and I do declare the following to be a full, clear, and exact description of the invention, such as will enable others skilled in the art to which it appertains to make and use the same, reference being had to the accompanying drawings, and to the figures of reference marked thereon, which form a part of this specification.

In swivel-joints for electric light fixtures, or wall-electroliers, as ordinarily constructed, the inleading and outleading wires are led through the swiveled meeting ends of two pipes or tubes, the wires being continuous and unbroken. When one of the pipes or tubes is swung very often, one upon the other, the result is that one or both wires is cut or broken off, sometimes causing a short-circuit or an arc, and frequently giving rise to much trouble.

The present invention relates to and its object is to provide means for overcoming the difficulty here indicated. I attain this object by means of the devices and arrangement of parts hereinafter described, and shown and illustrated in the accompanying drawings, in which—

Figure 1, is a central vertical sectional elevation of my device; Fig. 2, a top plan view of the lower one of the contact-rings hereinafter referred to, and Fig. 3, an edge-view of the same.

Like parts are indicated by corresponding numerals throughout the drawings.

In the drawings, 1 is one of the tubes of a swinging bracket, and 2 the other tube of the bracket. The former tube is connected by a screw-thread or otherwise with a concavo-convex metal shell 1ª, and the latter tube is in like manner connected with a similar shell 2ª, the two shells being revolubly connected with each other in nearly spherical form,—if preferred,—by means of an axially disposed bolt 3 and nut 4. These two shells and the tubes are insulated from the parts further to be described by means of linings or shells 5, of suitable insulating material, and by a tube 6, of like material, surrounding the bolt 3. The internal shells 5 fit closely to and revolve with their respective outer shells.

7—7 are a pair of cylindrical blocks or disks, of fiber, vulcanized rubber or other suitable insulating material, which blocks fit into the inner shell-parts with their flat adjoining faces slightly separated. Embedded in or secured to the opposed faces of the two blocks 7 are two opposed flat metal rings, 8—8, one of the rings being cleft transversely at one side, as at 8ª, and bent upwardly, as at 8ᵇ, so that this portion of the ring will contact with and slide upon the other ring as a brush.

9 is a brass tube or thimble, insulated from the bolt 3 and from the rings 8, and having a flange 10 engaged by a binding-screw 11 sunk into one of the blocks 7. The opposite end of the tube 9 telescopically engages a short corresponding tube 12 having a flange 13 engaged by a binding-screw 14 sunk into the other block 7. The inleading, say, positive wire is connected with the binding-screw 11 and the outleading positive wire is connected with the binding-screw 14. The electrical connection between these two wires is now through the telescoped tubes 9 and 12, their flanges 10—13, and the binding-screws 11—14. A binding-screw 15 passes through one of the blocks 7 and is engaged by means of its screw hole 15ª with its ring 8, the other ring being in like manner connected with a binding-screw 16 passing through its block, so that the negative inleading wire is electrically connected with the negative outleading wire through the binding-screws 15—16 and rings 8.

It will be seen that the tubes 9—12 may rotate axially upon each other in constant sliding contact; that the two rings 8—8 may rotate axially in constant sliding contact with each other; that the two inleading wires and the two outleading wires are, through these contacting tubes and rings, constantly in electrical connection; that either of the two shell-parts 1ª—2ª, with the tubes 1—2, may be swung around and around upon the other without twisting or in any manner affecting either of the wires, and that the difficulty above indicated is quite overcome.

Having described my invention, what I claim and desire to secure by Letters Patent is—

1. A swivel-joint for electric light fixtures, comprising an internally insulated two-part shell, connections which permit one shell-part to rotate upon the other, tubes connected with said shell-parts, inleading wires in one of said tubes, outleading wires in the other of said tubes, a pair of contact-rings capable of rotation upon each other with the rotation of the shell-parts, a pair of telescoped tubes disposed axially of said shell-parts and said rings, connections for one of said inleading wires and one of said outleading wires with said rings, and connections for the other of said inleading wires and the other of said outleading wires with said telescoped tubes.

2. In a device of the described character, a two-part shell, an axially disposed bolt which connects said shell-parts and permits their rotation, one part upon the other, tubes connected with said shell-parts, inleading wires in one of said tubes, outleading wires in the other of said tubes, a pair of insulating-blocks within the shell and axially revoluble about said bolt, a pair of contact-rings upon the adjacent faces of said blocks, a pair of telescoped tubes surrounding the bolt and insulated therefrom, connections between one of said inleading wires and one of said outleading wires and said rings, and connections between the other of said inleading wires and the other of said outleading wires and said telescoped tubes.

3. In a device of the described character, a pair of shell-sections, an axially disposed bolt which revolubly connects said two parts as a shell, a pair of insulating blocks within the shell and revoluble with the shell-parts, a pair of contact-rings upon the adjacent faces of the blocks, a tube surrounding the bolt and insulated therefrom and rigid with one of the blocks, a pair of wires leading into one of the shell-parts, a pair of wires leading from the other shell-part, connections for one of the inleading and one of the outleading wires with the rings and connections for the other of the inleading and the other of the outleading wires with said tube.

In testimony whereof I affix my signature in presence of two witnesses.

GUSTAV VOSSBERG.

Witnesses:
WM. C. BINKS,
E. HANSEN.